United States Patent

[11] 3,559,550

| [72] | Inventor | Frank G. Back |
| | | Glen Cove, N.Y. |
| [21] | Appl. No. | 717,827 |
| [22] | Filed | Apr. 1, 1968 |
| [45] | Patented | Feb. 2, 1971 |
| [73] | Assignee | Diversified Medical Corporation |
| | | Scarsdale, N.Y. |
| | | by mesne assignments |

[54] APPARATUS FOR TAKING PHOTOGRAPHS OF CAVITIES IN BODIES
5 Claims, 4 Drawing Figs.

[52] U.S. Cl. ............................................ 95/11.5, 95/11
[51] Int. Cl. .................................................. G03b 9/70
[50] Field of Search .......................................... 95/11HC, 11E,M or B, 11, 11.5; 315/240

[56] References Cited
UNITED STATES PATENTS

| 1,828,140 | 10/1931 | Heilpern | 95/11(HC) |
| 1,828,141 | 10/1931 | Back | 95/11(HC) |
| 2,349,932 | 5/1944 | Back | 95/11(HC) |
| 2,391,611 | 12/1945 | Back | 315/240X |
| 2,601,406 | 6/1952 | Marcouiller | 95/11(HC) |
| 2,665,617 | 1/1954 | Marcouiller | 95/11(HC) |

Primary Examiner—John M. Horan
Assistant Examiner—Alan Mathews
Attorney—Michael S. Striker ABSTRACT: A camera for photographing of cavities in bodies comprises a flash tube which produces light in the cavity of a body in synchronism with the operation of a shutter which normally covers the diaphragm of a chamber for photographic film. The switch which completes the circuit of the flash tube comprises a contact which is mounted on the shutter release and engages a second contact when the shutter is in fully open position. The circuit of the flash tube includes a capacitor which is connected in the secondary circuit of a transformer and discharges across the electrodes of the flash tube when the switch is closed in response to opening of the shutter. The primary circuit of the transformer contains a variable resistor which is adjustable as a function of the type or speed of film that is being used in the chamber.

PATENTED FEB 2 1971 3,559,550
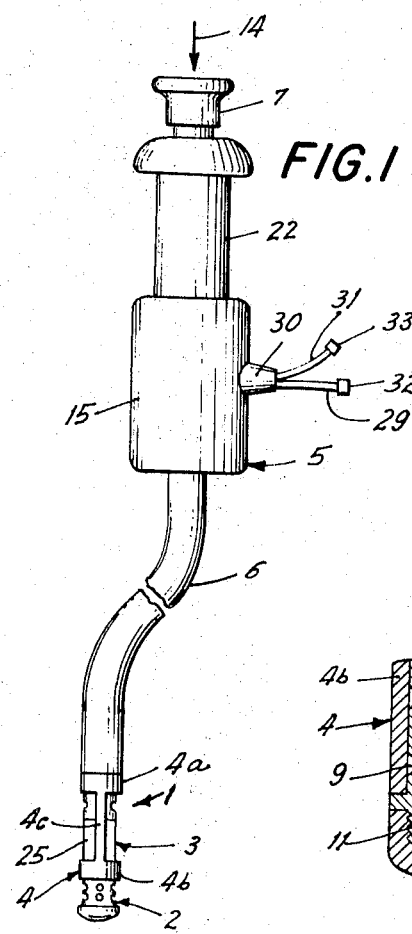
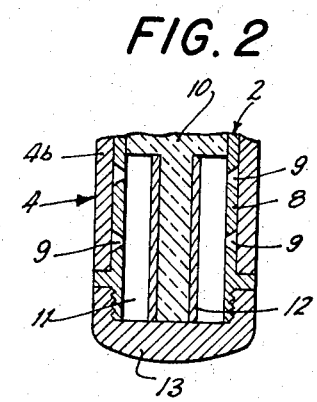
INVENTOR
FRANK G. BACK
BY
Michael S. Strike
ATTORNEY 3,559,550

APPARATUS FOR TAKING PHOTOGRAPHS OF CAVITIES IN BODIES

BACKGROUND OF THE INVENTION

The present invention relates to photographic apparatus. particularly to apparatus of the type which can be utilized for taking photographs in the cavities of bodies. Still more particularly, the invention relates to improvements in photographic apparatus of the type disclosed in my U.S. Pat. Nos. 2,349,932 and 2,391,611.

SUMMARY OF THE INVENTION

It is an object of my invention to provide a photographic apparatus for taking of photographs in cavities of bodies and to construct the apparatus in such a way that the operation of the shutter is properly synchronized with the operation of the lighting device which illuminates the area to be photographed in a cavity.

Another object of the invention is to provide a photographic apparatus which can be utilized with different types of photographic film and which can be readily and rapidly adjusted to furnish satisfactory exposures with two or more types of film.

A further object of the invention is to provide an apparatus which can be adjusted to furnish satisfactory exposures with films of greater or lesser sensitivity.

A concomitant object of the invention is to provide a photographic apparatus which is constructed and assembled in such a way that it can take pictures in cavities which contain fluids and wherein the operation of the shutter is synchronized with he operation of the lighting device in such a way that a picture can be completed before the fluid can enter by way of the diaphragm to contaminate the film in the chamber or chambers of the camera.

Briefly outlined, the improved photographic apparatus comprises a camera having an exposure chamber adapted to accommodate different types of film and a diaphragm (preferably one or more pinhole openings which can admit light reflected on the walls in the cavity of a human body), a shutter normally closing the diaphragm, a lighting device adjacent to the camera and operative to illuminate the area adjacent to the diaphragm, an electric circuit for supplying energy to the lighting device and including a normally open switch, and an operating mechanism for moving the shutter with reference to the camera or vice versa to thereby uncover the diaphragm and to simultaneously close the switch when the diaphragm is exposed so that the lighting device furnishes light at the exact moment when the shutter is in open position. The switch comprises a first contact, a second contact having an outwardly extending portion which is movable by operating means into engagement with the first contact, and resilient means for biasing the second contact away from the first contact.

In accordance with another feature of the invention, the circuit further comprises a capacitor which is connected in the secondary circuit of a transformer and discharges in response to closing of the switch to thereby operate the lighting device. The primary circuit of the transformer contains a variable resistor which is adjustable as a function of a characteristic of film which is being used in the chamber of the camera. For example, the resistor can be adjusted to account for the speed of color film in the chamber.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of a photographic apparatus which embodies the invention, the shutter of the apparatus being shown in open position;

FIG. 2 is an enlarged sectional view of the lower end portion of the apparatus shown in FIG. 1;

FIG. 3 is an enlarged sectional view of a switch housing in the apparatus of FIG. 1; and FIG. 4 is a diagrammatic view of the lighting device in the apparatus of FIG. 1 and of an electric circuit for the lighting device.

DESCRIPTION OF THE PREFERRED EMBODIMENTS

The photographic apparatus of FIG. 1 comprises a pair of cameras 1, 2, a lighting device 3, a shutter 4, a switch housing 5, an operating mechanism including a sleeve 6 and a plunger 7 for moving the cameras 1, 2 with reference to the shutter 4, and an electric circuit including a normally open synchronizing switch in the housing 5.

As shown in FIG. 2, the lower camera 2 comprises a cylindrical chamber 8 having several pinhole diaphragms 9 and accommodating a spider 10 provided with recesses 11 for photographic film 12. The spider 10 is accessible upon removal of a cap 13 which is screwed onto the lower end of the chamber 8. The other camera 1 is of similar design (refer to my U.S. Pat. NO. 2,349,932). Insofar as the present invention is concerned, the photographic apparatus may embody a single camera. The shutter 4 has two cylindrical portions 4a, 4b connected by one or more ribs 4c and normally closing the diaphragms 9 to prevent entry of light into the respective chambers. When the apparatus is to be put to use, the cameras 1, 2 are introduced into the cavity of a body, for example, into the stomach of a patient, and the plunger 7 is depressed in the direction indicated by arrow 14 (FIG. 1) to move the cameras 1, 2 with reference to the shutter 4 whereby the latter exposes the diaphragms 9 to permit light furnished by the device 3 to enter the chambers of the cameras and to expose the films 12. The shutter 4 is connected to the sleeve 6 whereas the chambers of the cameras 1, 2 share the movements of the plunger 7.

My invention is embodied in a novel synchronizing switch which is installed in the housing 5 and serves to automatically complete the circuit of lighting device 3 when the shutter 4 is in the fully open position shown in FIG. 1, i.e., when the diaphragms 9 are free to admit light produced by the device 3 and reflected on the surfaces or contents of the cavity which accommodates the cameras 1 and 2. The interior of the housing 5 is shown in FIG. 3. This housing comprises a cylindrical shell 15 of insulating material which is connected to one end of the sleeve 6. The shell 15 accommodates a fixed annular contact 16 of the synchronizing switch and the flange 17 at the lower end of the annular portion 18 of a movable second contact 19. A helical return spring 20 bears against a shoulder 21 in the annular contact 16 and against the lower end face of the flange 17 to bias the contact 19 to the position shown in FIG. 3 in which the synchronizing switch is open. The annular portion 18 of the movable contact 19 is rigidly connected with the plunger 7 and is surrounded by a tube 22 of insulating material. The plunger 7 also consists of insulating material and is connected with the upper end of a Bowden wire 23 which extends through the contacts 16, 19 and sleeve 6 and is connected to the cameras 1, 2 an lightly device 3. When the return spring 20 is free to expand, the contact 19 is automatically returns to the position shown in FIG. 3 and the shutter 4 is closed, i.e., its cylindrical portions 4a, 4b respectively overlie the diaphragms 9 of the chambers 8 in the cameras 1 and 2. The entire electric circuit and the details of the lighting device 3 are shown in FIG. 4. The lighting device 3 comprises a transparent cylindrical envelope 25 which is installed between the chambers 8 of the cameras 1, 2 and whose ends accommodate two electrodes 26, 27 connected by a filament 28. The electrode 27 is connected with a conductor 29 (see also FIG. 3) which passes through the sleeve 6 and a nipple 30 of the switch housing 5. The electrode 26 is electrically connected with the Bowden wire 23 and movable contact 19 of the synchronizing switch. A further conductor 31 is connected with the fixed contact 16 and extends from the switch housing 5 by way of the nipple 30. The conductors 29, 31 are provided with terminals or clamps 32, 33 which can be coupled to terminals of conductors 34, 35 in the secondary circuit of a transformer 36. This secondary circuit further comprises a capacitor 37 in parallel with a voltmeter 38 and in series with a fixed resistor 39 and a rectifier diode 40. The primary circuit of the transformer 36 is connected to a source 41 of alternating current and contains a variable resistor 42 which can be adjusted so that its resistance is a function of the speed of film 12 in the chambers 8 of the cameras 1, 2.

In order to make a set of exposures, the chambers 8 are loaded with fresh film 12 and the cameras 1, 2 are introduced into a cavity in a manner as described above. The primary circuit of the transformer 36 is connected to the energy source 41 so that the capacitor 37 is charged. The user then depresses the plunger 7 (arrow 14) to open the shutter 4 and to close the synchronizing switch when the shutter is fully open. The flange 17 of the movable contact 19 then bears against the adjacent end face of the annular fixed contact 16 and the capacitor 37 discharges across the electrodes 26, 27. The filament 28 produces light which penetrates into the cavity through the envelope 25 and is reflected on the walls or contents of the cavity to penetrate through the diaphragms 9 and to expose the films 12. The shutter 4 closes in response to termination of finger pressure upon the plunger 7 because the return spring 20 is then free to expand and shifts the movable contact 19 to the open position shown in FIG. 3. The cameras 1, 2 are then withdrawn from the cavity and the exposed films 12 are replaced by fresh films. The capacitor 37 is charged on opening of the synchronizing switch and the apparatus is ready for the next set of exposures.

The resistance of the variable resistor 42 is changed by the operator when the speed of film 12 to be used for a set of exposures is different from that of previously used film.

An important advantage of the synchronizing switch is that the flange 17 reinforces the annular portion 18 of the movable contact 19 and is sufficiently rigid to be engaged by a rather strong return spring 20 which is capable of closing the shutter 4 in immediate response to termination of finger pressure upon the plunger 7. Thus, the shutter 4 can close before a fluid which might fill the cavity can penetrate through the diaphragms 9. Moreover, the operator immediately notes that the shutter is in fully open position when the flange 17 lies flush against the adjoining end face of the fixed contact 16.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a photographic apparatus of the class described, a combination comprising camera means having at least one chamber adapted to accommodate photographic film; at least one diaphragm on said camera means for admitting light to said chamber and having at least one aperture of predetermined size; shutter means normally closing said aperture, one of said means being movable with reference to the other means to thereby uncover said aperture; a lighting device adjacent to said camera means and operative to illuminate the area adjacent to said diaphragm; an electric circuit for supplying energy to said lighting device and including transformer means having a primary circuit and a secondary circuit, and normally open synchronizing switch means installed in said secondary circuit; operating means having a movable portion for moving said one means with reference to said other means and for simultaneously closing said switch means to synchronize the operation of said lighting device with the uncovering of said aperture; and adjusting means installed in said primary circuit of said transformer means and comprising variable resistor means for adjusting the intensity of illumination afforded by said lighting device as a function of the characteristics of photographic film in said chamber.

2. A combination as defined in claim 1, further comprising capacitor means connected in said secondary circuit and arranged to discharge across said lighting device in response to closing of said switch means.

3. A combination as defined in claim 1, wherein said switch means includes first contact means comprising an annular member and second contact means connected with said movable portion of said operating means and having an outwardly extending portion and an annular portion, said outwardly extending portion constituting an annular flange on said annular portion, and resilient means comprising a helical spring received in said annular member and bearing against an end face of said flange for biasing said second contact means away from said first contact means.

4. A combination as defined in claim 3, wherein said operating means further comprises a sleeve rigid with said first contact means and said movable portion comprises a plunger reciprocable in said sleeve and connected with said second contact means.

5. A combination as defined in claim 1, wherein said shutter means comprises a cylinder and said chamber is of tubular shape and is slidably telescoped into said cylinder.